(12) United States Patent
Keller et al.

(10) Patent No.: US 8,481,639 B2
(45) Date of Patent: Jul. 9, 2013

(54) POLYMERS WITH SACCHARIDE SIDE GROUPS AND THEIR USE

(75) Inventors: Harald Keller, Ludwigshafen (DE); Liqun Ren, Mannheim (DE); Roland Ettl, Altluβheim (DE); Claudia Esper, Kindenheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/161,684

(22) Filed: Jun. 16, 2011

(65) Prior Publication Data

US 2011/0313097 A1 Dec. 22, 2011

Related U.S. Application Data

(60) Provisional application No. 61/355,616, filed on Jun. 17, 2010.

(51) Int. Cl.
*C08F 216/14* (2006.01)
*C08F 216/02* (2006.01)

(52) U.S. Cl.
USPC ....... 524/548; 526/238.23; 524/555; 524/558

(58) Field of Classification Search
USPC .................. 524/548, 555, 558; 526/538.23
See application file for complete search history.

(56) References Cited

U.S. PATENT DOCUMENTS

| | | | |
|---|---|---|---|
| 5,162,471 A | 11/1992 | Norberg et al. | |
| 6,040,406 A * | 3/2000 | Carrier et al. | 526/238.22 |
| 6,071,434 A * | 6/2000 | Davis et al. | 252/389.2 |
| 2011/0237743 A1 | 9/2011 | Ren et al. | |
| 2011/0237744 A1 | 9/2011 | Ren et al. | |
| 2011/0237750 A1 | 9/2011 | Ren et al. | |
| 2012/0028307 A1 | 2/2012 | Keller et al. | |

FOREIGN PATENT DOCUMENTS

| | | |
|---|---|---|
| WO | WO 90/10023 A1 | 9/1990 |
| WO | WO 2010/118950 A2 | 10/2010 |
| WO | WO 2010/118951 A2 | 10/2010 |

OTHER PUBLICATIONS

U.S. Appl. No. 13/192,771, filed Jul. 28, 2011, Keller, et al.
Jörgen Lönngren, et al., "Coupling of Aldobionic Acids to Proteins Using Water-Soluble Carbodiimide", Methods in Enzymology, vol. 242, 1994, pp. 116-118.
Hans-Ulrich Geyer, "Reaktion von aliphatischen Diaminen mit D-Gluconsäure-δ-lacton", Chem. Ber., 1964, pp. 2271-2275.
Roy L. Whistler, et al., "1-Acrylamido-1-deoxy-$_D$-glucitol, 1-Deoxy-1-methacrylamido-$_D$-glucitol and Their Polymerization", J. Org. Chem., vol. 26, May 1961, pp. 1583-1588.
Iqbal Gill, et al., "Enzymatic Glycosylation in Plasticized Glass Phases: A Novel and Efficient Route to O-Glycosides", Angew. Chem. Int. Ed., vol. 39, No. 21, 2000, pp. 3804-3808.

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

A water-soluble or water-dispersible copolymer comprises copolymerized units a) of at least one ethylenically unsaturated monomer with a saccharide side group and b) of at least one hydrophilic ethylenically unsaturated monomer different from (meth)acrylamide, where the weight fraction of the ethylenically unsaturated monomers with a saccharide side group is 5 to 95% by weight. The copolymers exhibit high affinity to inorganic surfaces or hydrophilic fibers, such as cotton. They serve as soil release and/or graying-inhibiting polymers in textile detergents or minimize the risk of microbial colonization of materials coated therewith.

9 Claims, No Drawings ively charged copolymers and their use in detergents.

POLYMERS WITH SACCHARIDE SIDE GROUPS AND THEIR USE

The present invention relates to polymers with saccharide side groups and their use as graying inhibitors in textile detergents and as antimicrobial coating, and to textile detergent compositions which comprise the polymers.

Besides the ingredients indispensible for the washing process, such as surfactants and builder materials, detergents generally comprise further washing auxiliaries. Such auxiliaries also include substances which impart soil release properties to the laundry fibers and assist the soil release of the other detergent constituents. Such soil release substances are often referred to as "soil-release" active ingredients or, on account of their ability to equip the treated surface, for example the fibers, with a soil repellent finish, as "soil repellents".

The term "graying" is understood as meaning the gray coloration of textiles during washing, which is brought about inter alia by a reattachment of the already detached dirt onto the fabric in finer distribution. The reattachment is probably triggered by electrostatic forces. The extent of the reattachment is dependent inter alia on the type of fabric and dirt, on the degree of soiling of the fabric, on the amount of water in the washing process and on the degree of mechanical agitation in the washing drum.

Soil release and/or graying-inhibiting copolymers and also their use in detergents have been known for a long time. On account of their chemical similarity, the known copolymers exhibit particular affinity to polyester fibers.

Bacterial infections represent a major problem in connection with medical instruments and devices, implant materials, wound protection films and dressing materials. The bacterial infections are triggered by the adhesion of surface-active bacteria and the resulting biofilm development primarily on hydrophobic surfaces. The adhesion of the bacteria to surfaces is based on the one hand on nonspecific interactions such as electrostatic interactions, Van-der-Waals forces and acid-base interactions and, on the other hand, on specific interactions such as receptor/ligand bonds. The surface of pathogenic bacteria is covered with adhesins, i.e. proteins which aid adhesion to surfaces. The nature of the surface of the materials such as roughness and surface tension are decisive criteria for the colonization of surfaces. For this reason, it is important, through a modification of the surfaces, to minimize the number of adhering bacteria and thus the plaque formation and the infection of adjacent tissue. WO 90/10023 describes a copolymer of an N-(meth)acryloylglycosylamine and of a (meth)acrylamide. The copolymers are said to be suitable for the binding of antigens in ELISA tests.

It is the object of the invention to provide polymers which exhibit high affinity to inorganic surfaces, such as metals or mineral materials, or hydrophilic fibers, such as cotton, and are suitable for modifying the surface properties of these materials.

It is a further object of the invention to provide soil release and/or graying-inhibiting active ingredients which exhibit a high affinity to hydrophilic fibers, such as in particular cotton.

It is a further object of the invention to provide polymers which minimize the risk of microbial colonization of materials coated therewith.

The object is achieved according to the invention by a water-soluble or water-dispersible copolymer comprising copolymerized units
a) of at least one ethylenically unsaturated monomer with a saccharide side group and
b) of at least one hydrophilic ethylenically unsaturated monomer different from (meth)acrylamide,
where the weight fraction of the ethylenically unsaturated monomers with a saccharide side group is 5 to 95% by weight, preferably 35 to 90% by weight, in particular 50 to 85% by weight.

Hydrophilic ethylenically unsaturated monomers are understood as meaning those which have a solubility in water of at least 50 g/l at 25° C.

The polymers according to the invention are, optionally after neutralization, water-soluble or water-dispersible, i.e. they are essentially linear and not crosslinked.

The hydrophilic ethylenically unsaturated monomer is preferably selected from
b1) methyl acrylate;
b2) anionic/anionogenic monomers;
b3) cationic/cationogenic monomers;
b4) monomers with a hydroxyalkyl side group;
b5) monomers with a polyether side group;
b6) N-vinyl compounds; and
combinations thereof.

Of these, preference is given to anionic/anionogenic monomers, monomers with a hydroxyalkyl side group and monomers with a polyether side group and combinations thereof.

The weight fractions of the units of copolymerized monomers are stated in the present case as fractions by weight, based on the total weight of the units of all of the copolymerized monomers in the copolymer.

In general, copolymers according to the invention comprise
a) 5 to 95% by weight, preferably 35 to 90% by weight, in particular 50 to 85% by weight, of units of at least one ethylenically unsaturated monomer with a saccharide side group,
b) 95 to 5% by weight, preferably 15 to 50% by weight, of units of at least one hydrophilic ethylenically unsaturated monomer different from (meth)acrylamide, and
c) 0 to 40% by weight, preferably 5 to 20% by weight, of units of at least one ethylenically unsaturated monomer different from a) and b).

The copolymers according to the invention generally exhibit high electrolyte stability and high colloid stability in hot water. They exhibit high affinity to various surfaces, such as cotton, glass, ceramic, metal, such as stainless steel, inorganic materials, such as calcium silicate or calcium carbonate.

The copolymers are based on nontoxic starting materials from renewable sources and are biodegradable.

Ethylenically unsaturated monomers with a saccharide side group are compounds with an ethylenically unsaturated group, such as e.g. a (meth)acrylic, vinyl or allyl group, to which a saccharide radical is covalently bonded via a linker. A saccharide radical is considered to be a radical with at least three hydroxyl groups, preferably at least four hydroxyl groups, which are bonded to adjacent (successive) carbon atoms, where one or more hydroxyl groups may be part of a glycosidic bond to further saccharide units. The saccharide radical is preferably derived from a saccharide from a natural source or a derivative thereof, such as a sugar alcohol, a sugar acid or a glycosamine.

The saccharide radical may be a monosaccharide radical, disaccharide radical or oligosaccharide radical. Oligosaccharides are understood as meaning compounds with 3 to 20 saccharide repeat units. Preferred oligosaccharides are selected from tri-, tetra-, penta-, and hexa-, hepta-, octa-, nona- and decasaccharides, preferably saccharides with 3 to 9 repeat units. The linkage within the chains is preferably 1,4-glycosidic and optionally 1,6-glycosidic.

A monosaccharide radical is preferably a radical derived from an aldohexose, in particular from arabinose, ribose, xylose, mannose, galactose and in particular glucose.

A disaccharide radical is preferably a radical derived from lactose, maltose, isomaltose.

An oligosaccharide radical is e.g. a radical derived from maltotriose, maltotetraose and maltopentaose or a radical derived from a saccharide mixture obtainable by hydrolysis of a polysaccharide, such as hydrolysis of cellulose or starch. Mixtures of this type are obtainable by hydrolysis of a polysaccharide, for example enzymatic hydrolysis of cellulose or starch or acid-catalyzed hydrolysis of cellulose or starch. Vegetable starch consists of amylose and amylopectin as main constituent of the starch. Amylose consists of predominantly unbranched chains of glucose molecules which are linked together 1,4-glycosidically. Amylopectin consists of branched chains in which, as well as the 1,4-glycosidic linkages, there are additionally 1,6-glycosidic linkages which lead to branches. According to the invention, hydrolysis products of amylopectin as starting compound for the process according to the invention are also suitable and are encompassed by the definition of oligosaccharides.

Preferred ethylenically unsaturated monomers with a saccharide side group correspond to one of the formulae (Ia), (Ib), (Ic), (Id) or (Ie)

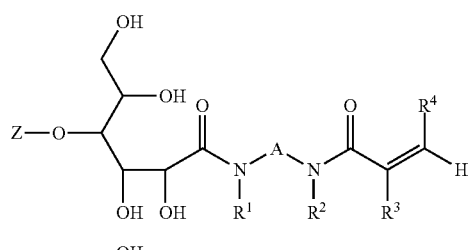
(Ia)

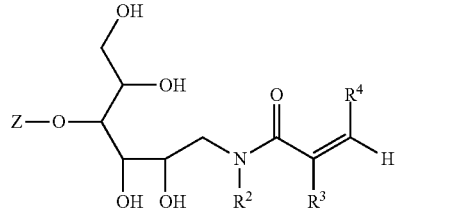
(Ib)

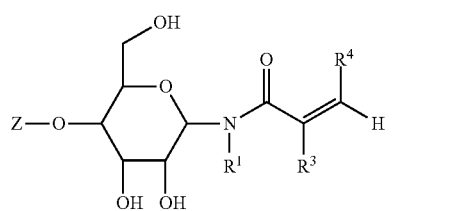
(Ic)

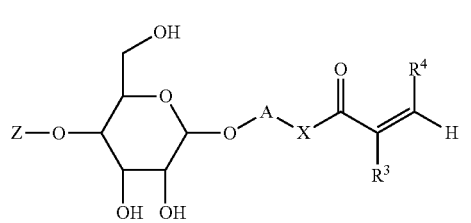
(Id)

in which
Z is H or a saccharide radical;

A is $C_2$-$C_{10}$-alkylene which may optionally be interrupted by oxygen in ether function and/or may be substituted by one or two carboxyl, hydroxyl and/or carboxamide groups, or is a cycloaliphatic radical;

X is O or $NR^1$, in particular O or NH;

$R^1$ and $R^2$, independently of one another, are hydrogen, $C_1$-$C_4$-alkyl or $C_1$-$C_4$-hydroxyalkyl;

$R^3$ is H or methyl;

$R^4$ is H, COOH or $COO^-M^+$; and $M^+$ is an alkali metal ion or an ammonium ion.

A is $C_2$-$C_{10}$-alkylene which may optionally be interrupted by oxygen in ether function and/or may be substituted by one or two carboxyl, hydroxyl and/or carboxamide groups, or is a cycloaliphatic radical. Preferably, A is $C_2$-$C_6$-alkylene, such as 1,2-ethanediyl, 1,2-propanediyl, 1,3-propanediyl, 1,4-butanediyl, 1,5-pentanediyl, 1,6-hexanediyl, or a cycloaliphatic radical, such as 1,2-cyclopentanediyl, 1,3-cyclopentanediyl, 1,2-cyclohexanediyl, 1,3-cyclohexanediyl or 1,4-cyclohexanediyl.

$R^1$ and $R^2$, independently of one another, are hydrogen, $C_1$-$C_4$-alkyl or $C_1$-$C_4$-hydroxyalkyl, preferably hydrogen, methyl, ethyl or hydroxyethyl, in particular hydrogen or methyl.

Z is H or a saccharide radical. The saccharide radical may be a monosaccharide radical, disaccharide radical or oligosaccharide radical. The saccharide radical is generally bonded to the molecule via a glycosidic bond.

If Z is a saccharide radical, it preferably has the general formula

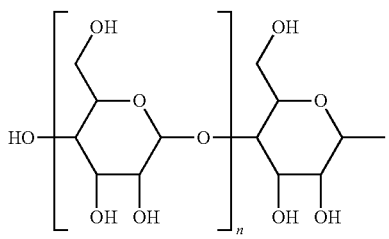

in which n is the number 0, 1, 2, 3, 4, 5, 6, 7 or 8.

Compounds of the formula (Ia) are obtainable by reacting a reaction product of a polyhydroxy acid lactone and an aliphatic diamine with the anhydride of a monounsaturated carboxylic acid, cf. the international patent application PCT/EP 2010/054208.

Polyhydroxy acid lactone is to be understood as meaning lactones of saccharides from a natural or synthetic source oxidized only on the anomeric carbon. Polyhydroxy acid lactones of this type can also be referred to as lactones of aldonic acids. The polyhydroxy acid lactones can be used individually or in their mixtures.

The saccharides are only selectively oxidized at the anomeric center. Processes for selective oxidation are generally known and are described, for example, in J. Lönnegren, I. J. Goldstein, Methods Enzymology, 242 (1994) 116. Thus, the oxidation can be carried out with iodine in an alkaline medium or with copper(II) salts.

Suitable aliphatic diamines may be linear, cyclic or branched.

Preference is given to using aliphatic $C_2$-$C_8$-diamines and cycloaliphatic diamines, such as 1,2-diaminoethane, 1,3-diaminopropane, 1,5-diaminopentane, 1,6-diaminohexane, N-methyl-1,3-diaminopropane, N-methyl-1,2-diaminoethane, 2,2-dimethylpropane-1,3-diamine, diaminocyclohexane, isophoronediamine and 4,4'-diaminodicyclohexylmethane.

The reaction of the diamines with the lactones is described in H. U. Geyer, Chem. Ber. 1964, 2271. Here, the molar ratio of aliphatic diamine to the polyhydroxy acid lactone can vary within a wide range, such as e.g. fluctuate within the ratio 5:1 to 0.3:1, in particular 3:1 to 0.4:1. Preferably, the aliphatic diamine is added to the polyhydroxy acid lactone in a molar ratio of about 2:1 to 0.5:1.

The anhydrides of a monounsaturated carboxylic acid are preferably selected from acrylic anhydride, methacrylic anhydride and maleic anhydride.

Compounds of the formula (Ib) are obtainable by reductive amination of the corresponding reducing saccharides and subsequent acrylation with acryloyl chloride as described by R. L. Whistler, J. Org. Chem. 26, 1961, 1583-1588.

Compounds of the formula (Ic) are obtainable e.g. by the process described in WO 90/10023. For this, a reducing sugar is reacted in solution with ammonium hydrogencarbonate to give a glycosylamine, which is reacted with a reactive derivative of (meth)acrylic acid to give N-(meth)acryloylglycosylamine.

A particularly expedient process involves reacting a reducing sugar with a primary aliphatic amine or ammonia in an aqueous medium and, without intermediate isolation, reacting it with the anhydride of a monounsaturated carboxylic acid, cf. the international patent application PCT/EP 2010/054211.

Compounds of the formula (Ie) are e.g. by glycosidase-catalyzed reaction of hydroxyl-group containing ethylenically unsaturated monomers with saccharides, as described e.g. by I. Gill and R. Valivety in Angew. Chem. Int. Ed. 2000, 39, No. 21, pp. 3804-3808.

In certain embodiments, the copolymers according to the invention comprise units of methyl acrylate, e.g. in a weight fraction of from 0 to 40% by weight, preferably 5 to 20% by weight.

In certain embodiments, the copolymers according to the invention comprise units of anionogenic/anionic monomers, e.g. in a weight fraction of from 0 to 95% by weight, preferably 15 to 50% by weight. "Anionic monomers" are understood as meaning ethylenically unsaturated monomers with anionic groups. "Anionogenic monomers" are understood as meaning monomers with a functional group which can be converted into an anionic group depending on the pH in the aqueous medium and is present e.g. at pH 12 to more than 90% in anionic form.

The anionic monomers include the salts of the monoethylenically unsaturated carboxylic acids, sulfonic acids, phosphonic acids and mixtures thereof, in particular the sodium, potassium and ammonium salts.

The anionogenic/anionic monomers include monoethylenically unsaturated mono- and dicarboxylic acids having 3 to 25, preferably 3 to 6, carbon atoms, which can also be used in the form of their salts or anhydrides. Examples thereof are acrylic acid, methacrylic acid, ethacrylic acid, crotonic acid, maleic acid, maleic anhydride, itaconic acid, citraconic acid, mesaconic acid, glutaconic acid, aconitic acid and fumaric acid. The anionogenic/anionic monomers also include the half-esters of monoethylenically unsaturated dicarboxylic acids having 4 to 10, preferably 4 to 6, carbon atoms, e.g. of maleic acid, such as monomethyl maleate. The anionogenic/anionic monomers also include monoethylenically unsaturated sulfonic acids and phosphonic acids, for example vinylsulfonic acid, allylsulfonic acid, sulfoethyl acrylate, sulfoethyl methacrylate, sulfopropyl acrylate, sulfopropyl methacrylate, 2-hydroxy-3-acryloxypropylsulfonic acid, 2-hydroxy-3-methacryloxypropylsulfonic acid, styrenesulfonic acid, 2-acrylamido-2-methylpropanesulfonic acid, vinylphosphonic acid and allylphosphonic acid.

Preferred anionogenic/anionic monomers are ethylenically unsaturated carboxylic acids, in particular acrylic acid, methacrylic acid, itaconic acid and maleic acid. Of these, methacrylic acid is particularly preferred.

In certain embodiments, the copolymers according to the invention comprise units of cationic/cationogenic monomers, e.g. in a weight fraction of from 0 to 95% by weight, preferably 5 to 50% by weight. "Cationogenic/cationic monomers" are understood as meaning ethylenically unsaturated monomers with cationogenic/cationic groups. "Cationogenic group" is understood as meaning a functional group which can be converted to a cationic group depending on the pH in the aqueous medium. The cationogenic and/or cationic groups are preferably nitrogen-containing groups, such as amino groups, and also quaternary ammonium groups. Charged cationic groups can be produced from amine nitrogens either by protonation, e.g. with carboxylic acids, such as lactic acid, or mineral acids, such as phosphoric acid, sulfuric acid and hydrochloric acid, or by quaternization, e.g. with alkylating agents, such as $C_1$-$C_4$-alkyl halides or sulfates. Examples of such alkylating agents are ethyl chloride, ethyl bromide, methyl chloride, methyl bromide, dimethyl sulfate and diethyl sulfate.

Suitable cationogenic monomers are e.g. N,N-dialkylaminoalkyl (meth)acrylates, such as N,N-dimethylaminomethyl (meth)acrylate, N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminocyclohexyl (meth)acrylate etc.

Suitable cationogenic monomers are also N,N-dialkylaminoalkyl (meth)acrylamides, such as N[2-(dimethylamino)ethyl]acrylamide, N-[2-(dimethylamino)ethyl]methacrylamide, N[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N[2-(diethylamino)ethyl]acrylamide, N-[2-(diethylamino)-ethyl]methacrylamide, N-[4-(dimethylamino)cyclohexyl]acrylamide and N-[4-(dimethylamino)cyclohexyl]methacrylamide. Preference is given to N,N-dimethylaminopropyl acrylate, N,N-dimethylaminopropyl methacrylate, N-[3-(dimethylamino)propyl]acrylamide and N-[3-(dimethylamino)propyl]methacrylamide.

Further cationogenic monomers are those with primary or secondary amino groups, e.g. esters of ethylenically unsaturated mono- and dicarboxylic acids with amino alcohols, amides of ethylenically unsaturated mono- and dicarboxylic acids with diamines and mixtures thereof.

Of suitability are e.g. the esters of ethylenically unsaturated mono- and dicarboxylic acids with amino alcohols, preferably $C_2$-$C_{12}$-amino alcohols. These can preferably be $C_1$-$C_8$-monoalkylated on the amine nitrogen. Suitable acid components of these esters are e.g. acrylic acid, methacrylic acid, fumaric acid, maleic acid, itaconic acid, crotonic acid, maleic anhydride, monobutyl maleate and mixtures thereof. Preference is given to using acrylic acid, methacrylic acid and mixtures thereof. Preference is given to N-methylaminoethyl (meth)acrylate, N-ethylaminoethyl (meth)acrylate, N-(n-propyl)aminoethyl(meth)acrylate, N-(n-butyl)aminoethyl (meth)acrylate, tert-butylaminoethyl (meth)acrylate. Particular preference is given to N-tert-butylaminoethyl methacrylate.

Also suitable are the amides of the aforementioned ethylenically unsaturated mono- and dicarboxylic acids with diamines which have at least one primary or secondary amino group. Of suitability are e.g. N-methylaminoethyl(meth)acrylamide, N-ethylaminoethyl(meth)acrylamide, N-(n-propyl)aminoethyl(meth)acrylamide, N-(n-butyl)aminoethyl(meth)acrylamide and N-tert-butylaminoethyl(meth)acrylamide.

Suitable cationogenic monomers are also vinyl- and allyl-substituted nitrogen heterocycles, such as vinylimidazole, N-vinyl-2-alkylimidazoles, e.g. N-vinyl-2-methyl-imidazole, and 2- and 4-vinylpyridine, 2- and 4-allylpyridine, and the salts thereof. Suitable cationic monomers are those with at least one quaternary ammonium group. Examples of cationic monomers which may be mentioned are N-trimethylammonium ethylacrylamidochloride, N-trimethylammonium ethylmethacrylamidochloride, N-trimethylammonium ethyl methacrylate chloride, N-trimethylammonium ethyl acrylate chloride, trimethylammonium ethylacrylamidomethosulfate, trimethylammonium ethylmethacrylamidomethosulfate, N-ethyldimethylammonium ethylacrylamidoethosulfate, N-ethyldimethylammonium ethylmethacrylamidoethosulfate, trimethylammonium propylacrylamidochloride, trimethylammonium propylmethacrylamidochloride, trimethylammonium propylacrylamidomethosulfate, trimethylammonium propylmethacrylamidomethosulfate and N-ethyldimethylammonium propylacrylamidoethosulfate. Preference is given to trimethylammonium propylmethacrylamidochloride.

In certain embodiments, the copolymers according to the invention comprise units of monomers with a hydroxyalkyl side group, e.g. in a weight fraction of from 0 to 95% by weight, preferably 15 to 70% by weight. Preferably, this monomer is selected from esters of ethylenically unsaturated mono- and dicarboxylic acids with diols or amides of ethylenically unsaturated mono- and dicarboxylic acids with amino alcohols.

Suitable monomers are 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate and 3-hydroxy-2-ethylhexyl methacrylate.

Suitable monomers are also 2-hydroxyethylacrylamide, 2-hydroxyethylmethacrylamide, 2-hydroxyethylethacrylamide, 2-hydroxypropylacrylamide, 2-hydroxypropylmethacrylamide, 3-hydroxypropylacrylamide, 3-hydroxypropylmethacrylamide, 3-hydroxybutylacrylamide, 3-hydroxybutylmethacrylamide, 4-hydroxybutylacrylamide, 4-hydroxybutylmethacrylamide, 6-hydroxyhexylacrylamide, 6-hydroxyhexylmethacrylamide, 3-hydroxy-2-ethylhexylacrylamide and 3-hydroxy-2-ethylhexylmethacrylamide.

In certain embodiments, the copolymers according to the invention comprise units of a nonionic ethylenically unsaturated monomer with a polyether side group, e.g. in a weight fraction of from 0 to 95% by weight, preferably 15 to 70% by weight.

Suitable nonionic, ethylenically unsaturated monomers with a polyether side group are known per se. These are e.g.
(a) urethane-group-containing reaction products of a monoethylenically unsaturated isocyanate and a polyether,
(b) esters of ethylenically unsaturated carboxylic acids and polyethers,
(c) vinyl or allyl ethers of polyethers.

Suitable polyethers are preferably polyalkoxylated $C_1$-$C_{30}$-alcohols, such as fatty alcohol alkoxylates or oxo alcohol alkoxylates. At least 2, e.g. 2 to 100, preferably 3 to 20, mol of at least one $C_2$-$C_4$-alkylene oxide are used per mole of alcohol. Different alkylene oxide units can be arranged blockwise or be present in random distribution. Preferably, the alkylene oxide used is ethylene oxide and/or propylene oxide.

In preferred embodiments, the nonionic, ethylenically unsaturated monomer with a polyether side group has the general formula

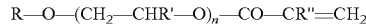

in which R is H or $C_1$-$C_{30}$-alkyl, preferably $C_1$-$C_{22}$-alkyl,
R' is hydrogen or methyl, preferably hydrogen,
R" is hydrogen or methyl, preferably methyl, and
n is an integer from 2 to 100, preferably 3 to 50.

The repeat units in the brackets are derived from ethylene oxide or propylene oxide. The meaning of R' in each repeat unit is independent of other repeat units. Different alkylene oxide units can be arranged blockwise or be present in random distribution.

In certain embodiments, the copolymers according to the invention comprise units of N-vinyl compounds, e.g. in a weight fraction of from 0 to 40% by weight, preferably 5 to 20% by weight. Preferably, the N-vinyl compounds are selected from N-vinyllactams, N-vinylamides of saturated $C_1$-$C_8$-monocarboxylic acids. These include e.g. N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam. Suitable open-chain N-vinylamide compounds are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide.

Further hydrophilic ethylenically unsaturated monomers are also acrylamide and methacrylamide, and N—$C_1$-$C_8$-alkyl- and N,N-di($C_1$-$C_8$-)alkylamides of ethylenically unsaturated monocarboxylic acids. These include N-methyl(meth)acrylamide, N-ethyl(meth)acrylamide, N-propyl(meth)acrylamide, N-isopropyl(meth)acrylamide, N-(n-butyl)(meth)acrylamide, N-(tert-butyl)(meth)acrylamide, N,N-dimethyl(meth)acrylamide, N,N-diethyl(meth)acrylamide, piperidinyl(meth)acrylamide and morpholinyl(meth)acrylamide.

Furthermore, the copolymers according to the invention optionally comprise units of a further monomer which is preferably selected from esters of ethylenically unsaturated mono- and dicarboxylic acids with $C_1$-$C_{30}$-alkanols, esters of vinyl alcohol or allyl alcohol with $C_1$-$C_{30}$-monocarboxylic acids, vinyl ethers, vinyl aromatics, vinyl halides, vinylidene halides, $C_2$-$C_8$-monoolefins, nonaromatic hydrocarbons with at least two conjugated double bonds and mixtures thereof.

Suitable monomers are then methyl methacrylate, methyl ethacrylate, ethyl (meth)acrylate, ethyl ethacrylate, n-butyl (meth)acrylate, tert-butyl (meth)acrylate, tert-butyl ethacrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachinyl (meth)acrylate, behenyl (meth)acrylate, lignocerenyl (meth)acrylate, cerotinyl (meth)acrylate, melissinyl (meth)acrylate, palmitoleinyl (meth)

acrylate, oleyl (meth)acrylate, linolyl (meth)acrylate, linolenyl (meth)acrylate, stearyl (meth)acrylate, lauryl (meth)acrylate and mixtures thereof. Preferred monomers are $C_1$-$C_4$-alkyl (meth)acrylates. In certain embodiments, the copolymers according to the invention comprise units of methyl methacrylate, e.g. in a weight fraction of from 0 to 40% by weight, preferably 5 to 20% by weight.

Suitable monomers are also vinyl acetate, vinyl propionate, vinyl butyrate and mixtures thereof.

Suitable monomers are also ethylene, propylene, isobutylene, butadiene, styrene, α-methylstyrene, acrylonitrile, methacrylonitrile, vinyl chloride, vinylidene chloride, vinyl fluoride, vinylidene fluoride and mixtures thereof.

The copolymers according to the invention are prepared for example analogously to the processes described in general in "Ullmann's Encyclopedia of Industrial Chemistry, Sixth Edition, 2000, Electronic Release, keyword: Polymerisation Process". The (co)polymerization preferably takes place as free-radical polymerization in the form of solution polymerization, suspension polymerization, precipitation polymerization or emulsion polymerization or by bulk polymerization, i.e. without solvent. Particularly for the preparation of the anionic copolymers it is possible either to directly use an anionic monomer for the polymerization or firstly to use an anionogenic monomer for the polymerization and then to neutralize the resulting copolymer with a base after the polymerization.

For the polymerization, a suitable polymerization initiator is used. Thermally activatable free-radical polymerization initiators are preferred.

Suitable thermally activatable free-radical initiators are primarily those of the peroxy and azo type. These include, inter alia, hydrogen peroxide, peracetic acid, t-butyl hydroperoxide, di-t-butyl peroxide, dibenzoyl peroxide, benzoyl hydroperoxide, 2,4-dichlorbenzoyl peroxide, 2,5-dimethyl-2,5-bis(hydroperoxy)hexane, perbenzoic acid, t-butyl peroxypivalate, t-butyl peracetate, dilauroyl peroxide, dicapryloyl peroxide, distearoyl peroxide, dibenzoyl peroxide, diisopropyl peroxydicarbonate, didecyl peroxydicarbonate, dieicosyl peroxydicarbonate, di-t-butyl perbenzoate, azobisisobutyronitrile, 2,2'-azobis-2,4-dimethylvaleronitrile, water-soluble azo initiators, e.g. 2,2'-azobis[2-(2-imidazolin-2-yl)propane]dihydrochloride, 2,2'-azobis(2-methyl-propionamidine) dihydrochloride, 2,2'-azobis(1-imino-1-pyrrolidino-2-ethylpropane) dihydrochloride, 2,2'-azobis[2-methyl-N-(2-hydroxyethyl)propionamide]; ammonium persulfate, potassium persulfate, sodium persulfate and sodium perphosphate.

The persulfates (peroxodisulfates), in particular sodium persulfate and water-soluble azo initiators, in particular 2'-azobis[2-(2-imidazolin-2-yl)propane]dihydrochloride are most preferred.

While carrying out the polymerization, the initiator is used in an adequate amount to initiate the polymerization reaction. The initiator is usually used in an amount of from about 0.01 to 3% by weight, based on the total weight of the monomers used. The amount of initiator is preferably about 0.05 to 2% by weight and in particular 0.1 to 1% by weight, based on the total weight of the monomers used.

According to another preferred type of preparation, the copolymer is obtained by polymerization of a monomer mixture in the presence of a redox initiator system. A redox initiator system comprises at least one oxidizing agent component and at least one reducing agent component, where, in the reaction medium, preferably heavy metal ions are additionally present as catalyst, for example cerium salts, manganese salts or iron(II) salts.

Suitable oxidizing agent components are, for example, peroxides and/or hydroperoxides, such as hydrogen peroxide, tert-butyl hydroperoxide, cumene hydroperoxide, pinane hydroperoxide, diisopropylphenyl hydroperoxide, dicyclohexyl percarbonate, dibenzoyl peroxide, dilauroyl peroxide and diacetyl peroxide. Hydrogen peroxide and tert-butyl hydroperoxide are preferred.

Suitable reducing agent components are alkali metal sulfites, alkali metal dithionites, alkalimetal hyposulfites, sodium hydrogensulfite, Rongalit C (sodium formaldehyde sulfoxylate), mono- and dihydroxyacetone, sugars (e.g. glucose or dextrose), ascorbic acid and its salts, acetone bisulfite adduct and/or an alkali metal salt of hydroxymethanesulfinic acid. Ascorbic acid is preferred.

Also suitable as reducing agent component or catalyst are iron(II) salts, such as e.g. iron(II) sulfate, tin(II) salts, such as e.g. tin(II) chloride, titanium(III) salts, such as titanium(III) sulfate.

The use amounts of oxidizing agent are 0.001 to 5.0% by weight, preferably from 0.005 to 1.0% by weight and particularly preferably from 0.01 to 0.5% by weight, based on the total weight of the monomers used. Reducing agents are used in amounts of from 0.001 to 2.0% by weight, preferably from 0.005 to 1.0% by weight and particularly preferably from 0.01 to 0.5% by weight, based on the total weight of the monomers used.

A particularly preferred redox initiator system is the system sodium peroxodisulfate/ascorbic acid. A further particular redox initiator system is the system t-butyl hydroperoxide/hydrogen peroxide/ascorbic acid, e.g. 0.001 to 5.0% by weight of t-butyl hydroperoxide.

The polymerization preferably takes place as a solution polymerization.

The solution polymerization generally takes place in water or in a mixture of at least one organic solvent with water or in an organic solvent or solvent mixture, preferably in water or in a mixture of at least one organic solvent with water. Suitable organic solvents are those which have at least limited miscibility with water at 20° C., and are in particular completely miscible with water at 20° C. This is understood as meaning a miscibility of at least 10 vol % solvent, in particular at least 50 vol % solvent in water at 20° C. By way of example, mention may be made of $C_1$-$C_3$-alcohols, e.g. methanol, ethanol, propanol, isopropanol, ketones such as acetone, methyl ethyl ketone, mono-, oligo- or polyalkylene glycols or thioglycols which have $C_2$-$C_6$-alkylene units, such as ethylene glycol, 1,2- or 1,3-propylene glycol, 1,2- or 1,4-butylene glycol, $C_1$-$C_4$-alkyl ethers of polyhydric alcohols, such as ethylene glycol monomethyl or monoethyl ethers, diethylene glycol monomethyl or monoethyl ethers, diethylene glycol monobutyl ether (butyl diglycol) or triethylene glycol monomethyl or monoethyl ethers, $C_1$-$C_4$-alkyl esters of polyhydric alcohols, γ-butyrolactone or dimethyl sulfoxide or tetrahydrofuran. Preference is given to mixtures of the organic solvents with water, in which case the water content can be up to 95% by weight. Particular preference is given to mixtures of methanol with water.

The solution polymerization usually takes place at 35 to 95° C. It can be carried out either as a batch process or else in the form of a feed process. Preference is given to the feed procedure in which at least some of the polymerization initiator and optionally some of the monomers are introduced as initial charge and heated to the polymerization temperature and then the remainder of the polymerization batch is introduced, usually via two or more separate feeds, of which one or more comprise the monomers in pure, dissolved or emulsified form, continuously or stepwise to maintain the polymerization. Preferably, the monomer feed takes place in the form of an aqueous monomer emulsion. In parallel to the monomer feed, further polymerization initiator can be metered in.

During the polymerization, chain transfer agents can optionally be co-used. Typical chain transfer agents comprise mercaptans such as, for example, 2-mercaptoethanol, thioglycolic acid, n-dodecyl mercaptan and tert-dodecyl mercaptan, alpha-methylstyrene dimer, 1-phenylbutene-2-fluorene, terpinol and chloroform.

The copolymers according to the invention are suitable as soil release and/or graying-inhibiting active ingredients in textile detergents.

The copolymers according to the invention are moreover suitable as antimicrobial coating.

The coating according to the invention is in particular suitable for the coating of material surfaces in the medical-therapeutic application, for example for the coating of metallic implants, of wound protection films and dressing material or for the coating of medical instruments and devices, such as catheters. In the field of biotechnology, the coating according to the invention is suitable in particular for the construction of apparatuses (e.g. fermentors), for the coating of seals and for suppressing biofouling.

Moreover, the invention relates to a detergent or cleaner composition which comprises a copolymer according to the invention.

Besides the copolymer, the detergents or cleaners comprise surfactant(s), where anionic, nonionic, cationic and/or amphoteric surfactants can be used. From an applications point of view, preference is given to mixtures of anionic and nonionic surfactants. The total surfactant content of the liquid detergents or cleaners is preferably 5 to 60% by weight and particularly preferably 15 to 40% by weight, based on the total liquid detergent or cleaner.

The nonionic surfactants used are preferably alkoxylated, advantageously ethoxylated, in particular primary alcohols having preferably 8 to 18 carbon atoms and on average 1 to 12 mol of ethylene oxide (EO) per mole of alcohol, in which the alcohol radical can be linear or preferably methyl-branched in the 2 position or can comprise linear and methyl-branched radicals in the mixture, as are usually present in oxo alcohol radicals. In particular, however, preference is given to alcohol ethoxylates with linear radicals from alcohols of native origin having 12 to 18 carbon atoms, for example from coconut alcohol, palm alcohol, tallow fatty alcohol or oleyl alcohol, and on average 2 to 8 EO per mole of alcohol. Preferred ethoxylated alcohols include, for example, $C_{12}$-$C_{14}$-alcohols with 3 EO, 4 EO or 7 EO, $C_9$-$C_{11}$-alcohol with 7 EO, $C_{13}$-$C_{15}$-alcohols with 3 EO, 5 EO, 7 EO or 8 EO, $C_{12}$-$C_{18}$-alcohols with 3 EO, 5 EO or 7 EO and mixtures of these, such as mixtures of $C_{12}$-$C_{14}$-alcohol having 3 EO and $C_{12}$-$C_{18}$-alcohol having 7 EO. The stated degrees of ethoxylation are statistical average values which may be an integer or a fraction for a specific product. Preferred alcohol ethoxylates have a narrowed homolog distribution (narrow range ethoxylates, NRE). In addition to these nonionic surfactants, it is also possible to use fatty alcohols with more than 12 EO. Examples thereof are tallow fatty alcohol having 14 EO, 25 EO, 30 EO or 40 EO. It is also possible to use nonionic surfactants which comprise EO and PO groups together in the molecule. In this connection, it is possible to use block copolymers with EO-PO block units or PO-EO block units, but also EO-PO-EO copolymers or PO-EO-PO copolymers. It is of course also possible to use mixed alkoxylated nonionic surfactants in which EO and PO units are not blockwise, but in random distribution. Such products are obtainable through the simultaneous action of ethylene oxide and propylene oxide on fatty alcohols.

Moreover, further nonionic surfactants that can be used are also alkyl glycosides of the general formula (I)

in which $R^1$ is a primary straight-chain or methyl-branched, in particular 2-methyl-branched aliphatic radical having 8 to 22, preferably 12 to 18, carbon atoms, and G is a glycoside unit with 5 or 6 carbon atoms, preferably glucose. The degree of oligomerization x, which indicates the distribution of monoglycosides and oligoglycosides, is any desired number between 1 and 10; preferably, x is 1.2 to 1.4.

A further class of preferably used nonionic surfactants which are used either as the sole nonionic surfactant or in combination with other nonionic surfactants are alkoxylated, preferably ethoxylated or ethoxylated and propoxylated fatty acid alkyl esters, preferably having 1 to 4 carbon atoms in the alkyl chain, in particular fatty acid methyl esters, as are described, for example, in the Japanese patent application JP 58/217598 or which are preferably prepared by the method described in the international patent application WO-A-90/13533.

Nonionic surfactants of the amine oxide type, for example N-cocoalkyl-N,N-dimethylamine oxide and N-tallow-alkyl-N,N-dihydroxyethylamine oxide, and of the fatty acid alkanolamide type may also be suitable. The amount of these nonionic surfactants is preferably not more than that of the ethoxylated fatty alcohols, in particular not more than half thereof.

Further suitable surfactants are polyhydroxy fatty acid amides of the formula (2),

in which $R^2C(=O)$ is an aliphatic acyl radical having 6 to 22 carbon atoms, $R^3$ is hydrogen, an alkyl or hydroxyalkyl radical having 1 to 4 carbon atoms and [Z] is a linear or branched polyhydroxyalkyl radical having 3 to 10 carbon atoms and 3 to 10 hydroxyl groups. The polyhydroxy fatty acid amides are known substances which can usually be obtained by reductive amination of a reducing sugar with ammonia, an alkylamine or an alkanolamine and subsequent acylation with a fatty acid, a fatty acid alkyl ester or a fatty acid chloride.

The group of polyhydroxy fatty acid amides also includes compounds of the formula (3)

in which $R^4$ is a linear or branched alkyl or alkenyl radical having 7 to 12 carbon atoms, $R^5$ is a linear, branched or cyclic alkylene radical having 2 to 8 carbon atoms or an arylene radical having 6 to 8 carbon atoms and $R^6$ is a linear, branched or cyclic alkyl radical or an aryl radical or an oxy-alkyl radical having 1 to 8 carbon atoms, where $C_1$-$C_4$-alkyl or phenyl radicals are preferred, and $[Z]^1$ is a linear polyhydroxyalkyl radical whose alkyl chain is substituted by at least two hydroxyl groups, or alkoxylated, preferably ethoxylated or propoxylated derivatives of this radical. $[Z]^1$ is preferably obtained by reductive amination of a sugar, for example glucose, fructose, maltose, lactose, galactose, mannose or xylose. The N-alkoxy- or N-aryloxy-substituted compounds can then be converted to the desired polyhydroxy fatty acid amines, for example in accordance with WO-A-95/07331, through reaction with fatty acid methyl esters in the presence of an alkoxide as catalyst.

The content of nonionic surfactants in the liquid detergents or cleaners is preferably 1 to 30% by weight, preferably 7 to 20% by weight and in particular 9 to 15% by weight, in each case based on the total composition.

The anionic surfactants used are, for example, those of the sulfonate and sulfate type. Suitable surfactants of the sulfonate type are preferably $C_9$-$C_{13}$-alkylbenzenesulfonates, olefinsulfonates, i.e. mixtures of alkene- and hydroxyalkanesulfonates, and also disulfonates, as are obtained, for example, from $C_{12}$-$C_{18}$-monoolefins with terminal or internal double bond by sulfonation with gaseous sulfur trioxide and subsequent alkaline or acidic hydrolysis of the sulfonation products. Also suitable are alkanesulfonates which are obtained from $C_{12}$-$C_{18}$-alkanes, for example by sulfochlorination or sulfoxidation with subsequent hydrolysis or neutralization. Likewise, the esters of α-sulfo fatty acids (ester sulfonates), for example the α-sulfonated methyl esters of the hydrogenated coconut, palm kernel or tallow fatty acids, are also suitable.

Further suitable anionic surfactants are sulfated fatty acid glycerol esters. Fatty acid glycerol esters are to be understood as meaning the mono-, di- and triesters, and mixtures thereof, as are obtained in the preparation by esterification of a monoglycerol with 1 to 3 mol of fatty acid or during the transesterification of triglycerides with 0.3 to 2 mol of glycerol. Preferred sulfated fatty acid glycerol esters here are the sulfation products of saturated fatty acids having 6 to 22 carbon atoms, for example of caproic acid, caprylic acid, capric acid, myristic acid, lauric acid, palmitic acid, stearic acid or behenic acid.

The alk(en)yl sulfates are preferably the alkali metal and in particular the sodium salts of the sulfuric acid half-esters of $C_{12}$-$C_{18}$-fatty alcohols, for example of coconut fatty alcohol, tallow fatty alcohol, lauryl alcohol, myristyl alcohol, cetyl alcohol or stearyl alcohol or of the $C_{10}$-$C_{20}$-oxo alcohols and those half-esters of secondary alcohols of these chain lengths. Furthermore, preference is given to alk(en)yl sulfates of the specified chain length which comprise a synthetic, petrochemical-based straight-chain alkyl radical which have an analogous degradation behavior to the equivalent compounds based on fatty chemical raw materials. From a washing point of view, the $C_{12}$-$C_{16}$-alkyl sulfates and $C_{12}$-$C_{15}$-alkyl sulfates and also $C_{14}$-$C_{15}$-alkyl sulfates are preferred. 2,3-Alkyl sulfates, which are prepared, for example, in accordance with the U.S. Pat. Nos. 3,234,258 or 5,075,041 and can be obtained as commercial products from the Shell Oil Company under the name DAN®, are also suitable anionic surfactants.

The sulfuric acid monoesters of the straight-chain or branched $C_7$-$C_{21}$-alcohols ethoxylated with 1 to 6 mol of ethylene oxide, such as 2-methyl-branched $C_9$-$C_{11}$-alcohols with on average 3.5 mol of ethylene oxide (EO) or $C_{12}$-$C_{18}$-fatty alcohols with 1 to 4 EO, are also suitable. On account of their high foaming behavior, they are used in cleaners only in relatively small amounts, for example in amounts from 1 to 5% by weight.

Further suitable anionic surfactants are also the salts of alkylsulfosuccinic acid, which are also referred to as sulfosuccinates or as sulfosuccinic acid esters and which constitute monoesters and/or diesters of sulfosuccinic acid with alcohols, preferably fatty alcohols and in particular ethoxylated fatty alcohols. Preferred sulfosuccinates comprise $C_8$-$C_{18}$-fatty alcohol radicals or mixtures thereof. Particularly preferred sulfosuccinates comprise a fatty alcohol radical derived from ethoxylated fatty alcohols. In this connection, particular preference is in turn given to sulfosuccinates whose fatty alcohol radicals are derived from ethoxylated fatty alcohols with a narrow homolog distribution. It is likewise also possible to use alk(en)ylsuccinic acid having preferably 8 to 18 carbon atoms in the alk(en)yl chain or salts thereof.

Particularly preferred anionic surfactants are soaps. Saturated and unsaturated fatty acid soaps, such as the salts of lauric acid, myristic acid, palmitic acid, stearic acid, (hydrogenated) erucic acid and behenic acid, and also soap mixtures derived in particular from natural fatty acids, for example coconut, palm kernel, olive oil or tallow fatty acids, are suitable.

The anionic surfactants including the soaps can be present in the form of their sodium, potassium or ammonium salts, and also as soluble salts of organic bases, such as mono-, di- or triethanolamine. Preferably, the anionic surfactants are present in the form of their sodium or potassium salts, in particular in the form of the sodium salts.

The content of anionic surfactants in preferred detergents or cleaners is 2 to 30% by weight, preferably 2 to 40% by weight and in particular 5 to 22% by weight, in each case based on the total composition. It is particularly preferred that the amount of fatty acid soap is at least 2% by weight and particularly preferably at least 4% by weight and particularly preferably at least 6% by weight.

The viscosity of liquid detergents or cleaners can be measured by means of customary standard methods (for example Brookfield viscometer LVT-II at 20 rpm and 20° C., spindle 3) and is preferably in the range from 100 to 5000 mPas. Preferred compositions have viscosities of from 300 to 4000 mPas, with values between 1000 and 3000 mPas being particularly preferred.

In addition to the copolymer according to the invention and the surfactant(s), the detergents or cleaners can comprise further ingredients which further improve the application and/or esthetic properties of the liquid detergent or cleaner. As a rule, preferred compositions comprise one or more substances from the group of builders, bleaches, bleach activators, enzymes, electrolytes, nonaqueous solvents, pH extenders, fragrances, perfume carriers, fluorescent agents, dyes, hydrotopes, foam inhibitors, silicone oils, antiredeposition agents, optical brighteners, graying inhibitors, antishrink agents, anticrease agents, color transfer inhibitors, antimicrobial active ingredients, germicides, fungicides, antioxidants, corrosion inhibitors, antistatics, ironing aids, phobicization and impregnation agents, swelling and nonslip agents, and also UV absorbers.

Builders which may be present in the detergents or cleaners are, in particular, silicates, aluminum silicates (in particular zeolites), carbonates, salts of organic di- and polycarboxylic acids, and mixtures of these substances.

Suitable low molecular weight polycarboxylates as organic builders are, for example:
$C_4$-$C_{20}$-di-, -tri- and -tetracarboxylic acids, such as, for example, succinic acid, propanetricarboxylic acid, butanetetracarboxylic acid, cyclopentanetetracarboxylic acid and alkyl- and alkylenesuccinic acids with $C_2$-$C_{16}$-alkyl or -alkylene radicals;

$C_4$-$C_{20}$-hydroxycarboxylic acids, such as, for example, malic acid, tartaric acid, gluconic acid, glutaric acid, citric acid, lactobionic acid and sucrose mono-, -di- and -tricarboxylic acid;

aminopolycarboxylates, such as, for example, nitrilotriacetic acid, methylglycinediacetic acid, alaninediacetic acid, ethylenediaminetetraacetic acid and serinediacetic acid;

salts of phosphonic acids, such as, for example, hydroxyethanediphosphonic acid, ethylenediamine tetra(methylenephosphonate) and diethylenetriamine penta(methylenephosphate).

Suitable oligomeric or polymeric polycarboxylates as organic builders are, for example:

oligomaleic acids, as are described, for example, in EP-A 0 451 508 and EP-A 0 396 303;

co- and terpolymers of unsaturated $C_4$-$C_8$-dicarboxylic acids, where monoethylenically unsaturated monomers from group (i) in amounts of up to 95% by weight
from group (ii) in amounts of up to 60% by weight
from group (iii) in amounts of up to 20% by weight
may be present in copolymerized form as comonomers.

Suitable unsaturated $C_4$-$C_8$-dicarboxylic acids here are, for example, maleic acid, fumaric acid, itaconic acid and citraconic acid (methylmaleic acid). Preference is given to maleic acid.

Group (i) comprises monoethylenically unsaturated $C_3$-$C_8$-monocarboxylic acids, such as, for example, acrylic acid, methacrylic acid, crotonic acid and vinylacetic acid. From group (i), preference is given to using acrylic acid and methacrylic acid.

Group (ii) comprises monoethylenically unsaturated $C_2$-$C_{22}$-olefins, vinyl alkyl ethers with $C_1$-$C_8$-alkyl groups, styrene, vinyl esters of $C_1$-$C_8$-carboxylic acid, (meth)acrylamide and vinylpyrrolidone. From group (ii), preference is given to using $C_2$-$C_6$-olefins, vinyl alkyl ethers with $C_1$-$C_4$-alkyl groups, vinyl acetate and vinyl propionate.

Group (iii) comprises (meth)acrylic esters of $C_1$-$C_8$-alcohols, (meth)acrylonitrile, (meth)acrylamides, (meth)acrylamides of $C_1$-$C_8$-amines, N-vinylformamide and vinylimidazole.

If the polymers of group (ii) comprise vinyl esters in copolymerized form, these may also be present in partially or completely hydrolyzed form to give vinyl alcohol structural units. Suitable co- and terpolymers are known, for example, from U.S. Pat. No. 3,887,806 and SE-A 43 13 909.

Copolymers of dicarboxylic acids suitable as organic builders are preferably:

copolymers of maleic acid and acrylic acid in the weight ratio 10:90 to 95:5, particularly preferably those in the weight ratio 30:70 to 90:10 with molar masses of from 10 000 to 150 000;

terpolymers of maleic acid, acrylic acid and a vinyl ester of a $C_1$-$C_3$-carboxylic acid in the weight ratio 10(maleic acid):90(acrylic acid+vinyl ester) to 95(maleic acid):10(acrylic acid+vinyl ester), where the weight ratio of acrylic acid to vinyl ester can vary in the range from 20:80 to 80:20, and particularly preferably terpolymers of maleic acid, acrylic acid and vinyl acetate or vinyl propionate in the weight ratio 20(maleic acid):80(acrylic acid+vinyl ester) to 90(maleic acid):10(acrylic acid+vinyl ester), where the weight ratio of acrylic acid to the vinyl ester can vary in the range from 30:70 to 70:30;

copolymers of maleic acid with $C_2$-$C_8$-olefins in the molar ratio 40:60 to 80:20, where copolymers of maleic acid with ethylene, propylene or isobutane in the molar ratio 50:50 are particularly preferred.

Graft polymers of unsaturated carboxylic acids on low molecular weight carbohydrates or hydrogenated carbohydrates, cf. U.S. Pat. No. 5,227,446, DE-A 44 15 623, DE-A 43 13 909, are likewise suitable as organic builders.

Suitable unsaturated carboxylic acids here are, for example, maleic acid, fumaric acid, itaconic acid, citraconic acid, acrylic acid, methacrylic acid, crotonic acid and vinylacetic acid, and also mixtures of acrylic acid and maleic acid which are grafted on in amounts of from 40 to 95% by weight, based on the component to be grafted.

For the modification, additionally up to 30% by weight, based on the component to be grafted, of further monoethylenically unsaturated monomers may be present in copolymerized form. Suitable modifying monomers are the abovementioned monomers in groups (ii) and (iii).

Suitable graft bases are degraded polysaccharides, such as, for example, acidically or enzymatically degraded starches, inulins or cellulose, reduced (hydrogenated or reductively aminated) degraded polysaccharides, such as, for example, mannitol, sorbitol, aminosorbitol and glucamine, and also polyalkylene glycols with molar masses up to Mw=5000, such as, for example, polyethylene glycols, ethylene oxide/propylene oxide or ethylene oxide/butylene oxide block copolymers, random ethylene oxide/propylene oxide or ethylene oxide/butylene oxide copolymers, alkoxylated mono- or polybasic $C_1$-$C_{22}$-alcohols, cf. U.S. Pat. No. 4,746,456.

From this group, preference is given to using grafted degraded or degraded reduced starches and grafted polyethylene oxides, where 20 to 80% by weight of monomers, based on the graft component, are used in the graft polymerization. For the grafting, preference is given to using a mixture of maleic acid and acrylic acid in the weight ratio of from 90:10 to 10:90.

Polyglyoxylic acids as organic builders are described, for example, in EP-B 0 001 004, U.S. Pat. No. 5,399,286, DE-A 41 06 355 and EP-A 0 656 914. The end groups of the polyglyoxylic acids can have different structures.

Polyamidocarboxylic acids and modified polyamidocarboxylic acids as organic builders are known, for example, from EP-A 0 454 126, EP-B 0 511 037, WO-A 94/01486 and EP-A 0 581 452.

Preferably, the organic builders used are also polyaspartic acid or cocondensates of aspartic acid with further amino acids, $C_4$-$C_{25}$-mono- or -dicarboxylic acids and/or $C_4$-$C_{25}$-mono- or -diamines. Particular preference is given to using polyaspartic acids modified with $C_6$-$C_{22}$-mono- or -dicarboxylic acids or with $C_6$-$C_{22}$-mono- or -diamines and prepared in phosphorus-containing acids.

Condensation products of citric acid with hydroxycarboxylic acids or polyhydroxy compounds as organic builders are known, for example, from WO-A 93/22362 and WO-A 92/16493. Carboxyl-group-comprising condensates of this type usually have molar masses up to 10 000, preferably up to 5000.

Among the compounds which produce $H_2O_2$ in water and can serve as bleaches, sodium perborate tetrahydrate and sodium perborate monohydrate have particular importance. Further bleaches that can be used are, for example, sodium percarbonate, peroxypyrophosphates, citrate perhydrates, and peracidic salts or peracids that produce $H_2O_2$, such as perbenzoates, peroxophthalates, diperazelaic acid, phthaloiminoperacid or diperdodecanedioic acid.

In order to achieve an improved bleaching effect during washing at temperatures of 60° C. and below, bleach activators can be incorporated into the detergents or cleaners. Bleach activators which can be used are compounds which, under perhydrolysis conditions, produce aliphatic peroxocarboxylic acids having preferably 1 to 10 carbon atoms, in particular 2 to 4 carbon atoms, and/or optionally substituted perbenzoic acid. Substances which carry O- and/or N-acyl groups of the specified number of carbon atoms and/or optionally substituted benzoyl groups are suitable. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl or isononanoyl oxybenzenesulfonate (n- or iso-NOBS), carboxylic acid anhydrides, in particular phthalic anhydride, acylated polyhydric alcohols, in particular triacetin, ethylene glycol diacetate and 2,5-diacetoxy-2,5-dihydrofuran.

In addition to the conventional bleach activators, or instead of them, it is also possible to incorporate so-called bleach catalysts into the detergents or cleaners. These substances are bleach-boosting transition metal salts or transition metal complexes, such as, for example, Mn-, Fe-, Co-, Ru- or Mo-salene complexes or -carbonyl complexes. It is also possible to use Mn, Fe, Co, Ru, Mo, Ti, V and Cu complexes with nitrogen-containing tripod ligands, and also Co-, Fe-, Cu- and Ru-amine complexes as bleach catalysts.

Suitable enzymes are in particular those from the classes of the hydrolases, such as the proteases, esterases, lipases or lipolytic enzymes, amylases, cellulases and other glycosyl hydrolases and mixtures of said enzymes. All of these hydrolases contribute during washing to the removal of stains such as protein-, fat- or starch-containing stains and graying. Cellulases and other glycosyl hydrolases can moreover contribute to the color retention and to increasing the softness of the textile by removing pilling and microfibrils. Oxyreductases can also be used for the bleaching or for the inhibition of color transfer. Enzymatic active ingredients obtained from bacterial strains or fungi such as *Bacillus subtilis, Bacillus licheniformis, Streptomyceus griseus* and *Humicola insolens* are particularly well suited. Preference is given to using proteases of the subtilisin type and in particular proteases which are obtained from *Bacillus lentus*. Here, enzyme mixtures, for example of protease and amylase or protease and lipase or lipolytic enzymes or protease and cellulase or of cellulase and lipase or lipolytic enzymes or of protease, amylase and lipase or lipolytic enzymes or protease, lipase or lipolytic enzymes and cellulase, but in particular protease and/or lipase-containing mixtures or mixtures with lipolytic enzymes are of particular interest. Examples of such lipolytic enzymes are the known cutinases. Peroxidases or oxidases have also proven suitable in some cases. Suitable amylases include, in particular, α-amylases, isoamylases, pullulanases and pectinases. The cellulases used are preferably cellobiohydrolases, endo-glucanases and β-glucosidases, which are also called cellobiases, or mixtures of these. Since different types of cellulase differ in their CMCase and avicelase activities, the desired activities can be established through targeted mixtures of the cellulases.

The enzymes can be adsorbed to carriers in order to protect them against premature decomposition. The fraction of the enzyme, enzyme mixtures or enzyme granules can be, for example, about 0.1 to 5% by weight, preferably 0.12 to about 2.5% by weight.

A broad number of highly diverse salts can be used as electrolytes from the group of inorganic salts. Preferred cations are the alkali and alkaline earth metals, preferred anions are the halides and sulfates. From the point of view of production, the use of NaCl or $MgCl_2$ in the compositions is preferred. The fraction of electrolytes in the compositions is usually 0.5 to 5% by weight.

Nonaqueous solvents which can be used in the liquid detergents or cleaners originate, for example, from the group of mono- or polyhydric alcohols, alkanolamines or glycol ethers, provided they are miscible with water in the stated concentration range. Preferably, the solvents are selected from ethanol, n- or isopropanol, butanols, glycol, propane- or butanediol, glycerol, diglycol, propyl or butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol monomethyl or -ethyl ether, diisopropylene glycol monomethyl or -ethyl ether, methoxy-, ethoxy- or butoxytriglycol, isobutoxyethoxy-2-propanol, 3-methyl-3-methoxybutanol, propylene glycol t-butyl ether, and mixtures of these solvents. Nonaqueous solvents can be used in the liquid detergents or cleaners in amounts between 0.5 and 15% by weight, but preferably below 12% by weight and in particular below 9% by weight.

In order to bring the pH of the detergents or cleaners into the desired range, the use of pH extenders may be appropriate. All known acids or alkalis can be used here, provided their use is not precluded for applications-related or ecological reasons or for reasons of consumer protection. Usually, the amount of these extenders does not exceed 7% by weight of the total formulation.

In order to improve the esthetic impression of the detergents or cleaners, they can be colored with suitable dyes. Preferred dyes, the selection of which presents no difficulties at all to the person skilled in the art, have a high storage stability and insensitivity toward the other ingredients of the compositions and to light, and also no marked substantivity toward textile fibers, in order not to stain these.

Suitable foam inhibitors which can be used in the detergents or cleaners are, for example, soaps, paraffins or silicone oils, which can optionally be applied to carrier materials.

Suitable antiredeposition agents, which are also referred to as "soil repellents", are, for example, nonionic cellulose ethers, such as methylcellulose and methylhydroxypropyl-cellulose with a fraction of methoxy groups of from 15 to 30% by weight and of hydroxypropyl groups of from 1 to 15% by weight, in each case based on the nonionic cellulose ethers. Suitable soil release polymers are, for example, polyesters of polyethylene oxides with ethylene glycol and/or propylene glycol and aromatic dicarboxylic acids or aromatic and aliphatic dicarboxylic acids; polyesters of polyethylene oxides that are terminally kept at one end with di- and/or polyhydric alcohols and dicarboxylic acid, in particular polymers of ethylene terephthalates and/or polyethylene glycol terephthalates or anionically and/or nonionically modified derivatives of these. Of these, particular preference is given to the sulfonated derivatives of phthalic acid polymers and terephthalic acid polymers. Polyesters of this type are known, for example, from U.S. Pat. No. 3,557,039, GB-A 11 54 730, EP-A 0 185 427, EP-A 0 241 984, EP-A 0 241 985, EP-A 0 272 033 and U.S. Pat. No. 5,142,020. Further suitable soil release polymers are amphiphilic graft polymers or copolymers of vinyl and/or acrylic esters on polyalkylene oxides (cf. U.S. Pat. Nos. 4,746,456, 4,846,995, DE-A 37 11 299, U.S. Pat. Nos. 4,904,408, 4,846,994 and 4,849,126) or modified celluloses, such as, for example, methylcellulose, hydroxypropylcellulose or carboxymethylcellulose.

Optical brighteners (so-called whiteners) can be added to the detergents or cleaners in order to eliminate graying and yellowing of the treated textile fabrics. These substances attach to the fibers and bring about a brightening and quasi bleaching effect by converting invisible ultraviolet radiation into visible longer-wave light, where the ultraviolet light absorbed from the sunlight is emitted as pale bluish fluorescence and produces pure white with the yellow shade of grayed and/or yellowed laundry. Suitable compounds originate, for example, from the substance classes of the 4,4'-diamino-2,2'-stilbenedisulfonic acids (flavonic acids), 4,4'-distyrylbiphenylene, methylumbelliferones, coumarins, dihydroquinolinones, 1,3-diarylpyrazolines, naphthalimides, benzoxazole, benzisoxazole and benzimidazole systems, and the pyrene derivatives substituted by heterocycles. The optical brighteners are usually used in amounts between 0.03 and 0.3% by weight, based on the finished composition.

Graying inhibitors have the task of keeping the dirt detached from the fibers suspended in the liquor and thus preventing reattachment of the dirt. Of suitability for this purpose are water-soluble colloids mostly of an organic nature, for example glue, gelatin, salts of ether sulfonic acids of starch or of cellulose or salts of acidic sulfuric acid esters of cellulose or of starch. Water-soluble polyamides comprising acidic groups are also suitable for this purpose. Furthermore, soluble starch preparations and starch products other than those mentioned above can be used, for example degraded starch, aldehyde starches, etc. It is also possible to use polyvinylpyrrolidone. However, preference is given to using cellulose ethers, such as carboxymethylcellulose (Na salt), methylcellulose, hydroxyalkylcellulose and mixed ethers, such as methylhydroxyethylcellulose, methylhydroxypropylcellulose, methylcarboxymethylcellulose and mixtures thereof in amounts of from 0.1 to 5% by weight, based on the compositions.

Since textile fabrics, in particular made of rayon, viscose rayon, cotton and mixtures thereof can have a tendency to crease because the individual fibers are sensitive to bending, folding, pressing and squeezing at right angles to the fiber direction, the compositions can comprise synthetic anticrease agents. These include, for example, synthetic products based on fatty acids, fatty acid esters, fatty acid amides, fatty alkylol esters, fatty alkylolamides or fatty alcohols, which are mostly reacted with ethylene oxide, or products based on lecithin or modified phosphoric acid esters.

To control microorganisms, the detergents or cleaners can comprise antimicrobial active ingredients. A distinction is made here, depending on the antimicrobial spectrum and action mechanism, between bacteriostats and bactericides, fungistats and fungicides etc. Important substances from these groups are, for example, benzalkonium chlorides, alkylarylsulfonates, halophenols and phenol mercuriacetate.

In order to prevent undesired changes in the detergents or cleaners and/or the treated textile fabrics caused by the effect of oxygen and other oxidative processes, the compositions can comprise antioxidants. This class of compound includes, for example, substituted phenols, hydroquinones, pyrocatechins and aromatic amines, and also organic sulfides, polysulfides, dithiocarbamates, phosphites and phosphonates.

Increased wear comfort can result from the additional use of antistats which are additionally added to the compositions. Antistats increase the surface conductivity and thus permit an improved discharging of charges formed. External antistats are generally substances with at least one hydrophilic molecule ligand and produce a more or less hygroscopic film on the surfaces. These mostly interface-active antistats can be divided into nitrogen-containing antistats (amines, amides, quaternary ammonium compounds), phosphorus-containing antistats (phosphoric acid esters) and sulfur-containing antistats (alkylsulfonates, alkyl sulfates). External antistats are described, for example, in the patent applications FR 1,156, 513, GB 873 214 and GB 839 407. The lauryl(or stearyl) dimethylbenzylammonium chlorides disclosed here are suitable as antistats for textile fabrics and as additive for detergents where a hand-modifying effect is additionally achieved.

To improve the water absorption capacity, the rewettability of the treated textile fabrics and to facilitate ironing of the treated textile fabrics, silicone derivatives, for example, can be used in the detergents or cleaners. These additionally improve the wash-out behavior of the compositions through their foam-inhibiting properties. Preferred silicone derivatives are, for example, polydialkyl- or alkylarylsiloxanes in which the alkyl groups have 1 to 5 carbon atoms and are partially or completely fluorinated. Preferred silicones are polydimethylsiloxanes which can, optionally, be derivatized and then are aminofunctional or quaternized or have Si—OH, Si—H and/or Si—Cl bonds. The viscosities of the preferred silicones at 25° C. are in the range between 100 and 100 000 mPas, it being possible to use the silicones in amounts between 0.2 and 5% by weight, based on the total composition.

Finally, the detergents or cleaners can also comprise UV absorbers which attach to the treated textile fabrics and improve the photostability of the fibers. Compounds which have these desired properties are, for example, the compounds and derivatives of benzophenone with substituents in the 2 and/or 4 position that are effective as a result of nonradiative deactivation. Furthermore, substituted benzotriazoles, acrylates phenyl-substituted in the 3 position (cinnamic acid derivatives), optionally with cyano groups in the 2 position, salicylates, organic Ni complexes, and natural substances such as umbelliferone and the endogenous urocanic acid are also suitable.

In order to avoid the decomposition of certain detergent ingredients catalyzed by heavy metals, it is possible to use substances which complex heavy metals. Suitable heavy metal complexing agents are, for example, the alkali salts of ethylenediaminetetraacetic acid (EDTA), of nitrilotriacetic acid (NTA) or methylglycinediacetic acid (MGDA), and also alkali metal salts of anionic polyelectrolytes such as polymaleates and polysulfonates.

A preferred class of complexing agents is the phosphonates, which are present in preferred detergents or cleaners in amounts of from 0.01 to 2.5% by weight, preferably 0.02 to 2% by weight and in particular from 0.03 to 1.5% by weight. These preferred compounds include, in particular, organophosphonates, such as, for example, 1-hydroxyethane-1,1-diphosphonic acid (HEDP), aminotri(methylenephosphonic acid) (ATMP), diethylenetriaminepenta(methylenephosphonic acid) (DTPMP or DETPMP), and also 2-phosphonobutane-1,2,4-tricarboxylic acid (PBS-AM), which are mostly used in the form of their ammonium or alkali metal salts.

Besides these constituents, a detergent or cleaner can comprise dispersed particles, the diameter of which along their largest spatial expansion is 0.01 to 10 000 μm.

Particles may be microcapsules as well as granules, compounds and scented beads, with microcapsules being preferred.

The term "microcapsule" is understood as meaning aggregates which comprise at least one solid or liquid core which is surrounded by at least one continuous sheath, in particular a sheath made of polymer(s). Usually, these are finely dispersed liquid or solid phases surrounded by film-forming polymers, during the production of which the polymers, following emulsification and coacervation or interfacial polymerization, precipitate on to the material to be enveloped. The microscopically small capsules can be dried like powders. Besides single-core microcapsules, multicore aggregates are also known, also called microspheres, which comprise two or more cores distributed in the continuous coating material. Single-core or multicore microcapsules can additionally be surrounded by an additional second, third etc. sheath. Preference is given to single-core microcapsules with a continuous sheath. The sheath can consist of natural, semisynthetic or synthetic materials. Natural sheath materials are, for example, gum arabic, agar agar, agarose, maltodextrins, alginic acid and its salts, e.g. sodium alginate or calcium alginate, fats and fatty acids, cetyl alcohol, collagen, chitosan, lecithins, gelatin, albumin, shellac, polysaccharides, such as starch or dextran, sucrose and waxes. Semisynthetic coating materials are, inter alia, chemically modified celluloses, in particular cellulose esters and ethers, e.g. cellulose acetate, ethylcellulose, hydroxypropylcellulose, hydroxypropylmethylcellulose and carboxymethylcellulose, and also starch derivatives, in particular starch ethers and esters. Synthetic coating materials are, for example, polymers, such as polyacrylates, polyamides, polyvinyl alcohol or polyvinylpyrrolidone. In the interior of the microcapsules, sensitive, chemically or physically incompatible as well as volatile components (=active ingredients) of the aqueous liquid detergent or cleaner can be enclosed in a storage-stable and transport-stable manner. For example, optical brighteners, surfactants, complexing agents, bleaches, bleach activators, dyes, fragrances, antioxidants, builders, enzymes, enzyme stabilizers, antimicrobial active ingredients, graying inhibitors, antiredeposition agents, pH extenders, electrolytes, foam inhibitors and UV absorbers may be present in the microcapsules.

The microcapsules can also comprise cationic surfactants, vitamins, proteins, preservatives, detergency boosters or pearlizing agents. The fillings of the microcapsules can be solids or liquids in the form of solutions or emulsions or suspensions.

The microcapsules can have any desired form within the scope of manufacture, but are preferably approximately spherical. Their diameter along their largest spatial expansion can be between 0.01 μm (not visually recognizable as capsules) and 10 000 μm depending on the components present in their interior and the application. Preference is given to visible microcapsules with a diameter in the range from 100 μm to 7000 μm, in particular from 400 μm to 5000 μm. The microcapsules are accessible by known methods, with coacervation and interfacial polymerization being attributed the greatest importance. Microcapsules which can be used are all of the surfactant-stable microcapsules supplied on the market, for example the commercial products (the coating material is given in each in brackets) Hallcrest Microcapsules (gelatin, gum arabic), Coletica Thalaspheres (maritime collagen), Lipotec Millicapseln (alginic acid, agar agar), Induchem Unispheres (lactose, microcrystalline cellulose, hydroxypropylmethylcellulose); Unicerin C30 (lactose, microcrystalline cellulose, hydroxypropylmethylcellulose), Kobo Glycospheres (modified starch, fatty acid esters, phospholipids), Softspheres (modified agar agar) and Kuhs Probiol Nanospheres (phospholipids).

Alternatively, it is also possible to use particles which do not have a core-sheath structure, but in which the active ingredient is distributed in a matrix of a matrix-forming material. Such particles are also referred to as "speckies".

A preferred matrix-forming material is alginate. To produce alginate-based speckies, an aqueous alginate solution, which also comprises the active ingredient to be enclosed or the active ingredients to be enclosed, is dripped and then hardened in a precipitating bath comprising $Ca^{2+}$ ions or $Al^{3+}$ ions.

Alternatively, instead of alginate, other matrix-forming materials can be used. Examples of matrix-forming materials comprise polyethylene glycol, polyvinylpyrrolidone, polymethacrylate, polylysine, poloxamer, polyvinyl alcohol, polyacrylic acid, polyethylene oxide, polyethoxyoxazoline, albumin, gelatin, acacia, chitosan, cellulose, dextran, Ficoll®, starch, hydroxyethylcellulose, hydroxypropylcellulose, hydroxypropylmethylcellulose, hyaluronic acid, carboxymethylcellulose, carboxymethylcellulose, deacetylated chitosan, dextran sulfate and derivatives of these materials. The matrix formation takes place for these materials for example via gelling, polyanion-polycation interactions or polyelectrolyte-metal ion interactions. The preparation of particles with these matrix-forming materials is known per se.

The release of the active ingredients from the microcapsules or speckies usually takes place during the application of the compositions comprising them through decomposition of the sheath or the matrix as a result of mechanical, thermal, chemical or enzymatic action.

The invention is illustrated in more detail by the examples below.

EXAMPLE 1

Copolymerization of methacrylamidoethylgluconamide (MEGA) with methacrylic acid

The copolymerization was carried out at 60° C. under $N_2$. Firstly, 43 g (0.142 mol) of MEGA were dissolved in water in order to obtain a 25% strength by weight solution. 0.5 g (0.5% by weight, based on the monomers) of 2-mercaptoethanol was added as chain transfer agent. Two feeds were metered into this solution in parallel over a time period of 4 h: 58.4 g (0.6780 mol) of methacrylic acid dissolved in 36 g of methanol; and 1 g of 2,2'-azobis[2-(2-imidazolin-2-yl)propane]dihydrochloride (VAKO-44) as initiator, dissolved in 60 g of water. When the addition was complete, the polymerization was continued for 1 h.

This gave a copolymer with 100% monomer conversion (demonstrated by means of $^1H$ NMR spectrum) and a K value in accordance with Fikentscher of 14 as a highly viscous solution in the methanol/water reaction medium. This copolymer was neutralized with aqueous NaOH solution. The neutralized copolymer dissolved in the water.

EXAMPLE 2

Copolymerization of methacrylamidoethylgluconamide (MEGA) with sodium methacrylate The copolymerization was carried out at 60° C. under $N_2$. Firstly, 45 g (0.147 mol) of MEGA were dissolved in water in order to obtain a 15% strength by weight solution. 0.26 g (0.35% by weight, based on the monomers) of 2-mercaptoethanol was added as chain transfer agent. Two feeds were metered into this solution in parallel over a time period of 5 h: 30 g (0.349 mol) of sodium methacrylate dissolved in 60 g of water; and 0.75 g of 2,2'-azobis[2-(2-imidazolin-2-yl)propane]dihydrochloride (VAKO-44) as initiator (1% by weight, based on the monomers), dissolved in 60 g of water. When the addition was complete, the polymerization was continued for 1 h.

This gave a copolymer with 90% monomer conversion (demonstrated by means of $^1$H NMR spectrum) and a K value in accordance with Fikentscher of 50, as a slightly viscous solution in the aqueous reaction medium.

EXAMPLE 3

Copolymerization of MEGA with methyl acrylate and polyethylene glycol monomethyl ether methacrylate (MPEGMA)

The copolymerization was carried out at 60° C. under $N_2$. Firstly, 60 g (0.196 mol) of MEGA were dissolved in water in order to obtain a 25% strength by weight solution. 0.25 g (0.25% by weight, based on the monomers) of 2-mercaptoethanol was added as chain transfer agent. Two feeds were metered into this solution in parallel over a time period of 4 h: (i) 20 g (0.2323 mol) of methyl acrylate, dissolved in 54 g of methanol, and 20 g of MPEGMA (molecular weight 1098) (0.0182 mol), dissolved in 35 g of water; and (ii) 1 g (1% by weight, based on the monomers) of 2,2'-azobis[2-(2-imidazolin-2-yl)propane]dihydrochloride (VAKO-44) as initiator, dissolved in 74 g of water/methanol (1/1 weight/weight). When the addition was complete, the polymerization was continued for 1 h.

This gave a copolymer with 100% monomer conversion (demonstrated by means of $^1$H NMR spectrum) and a K value in accordance with Fikentscher of 21.

EXAMPLE 4

Copolymerization of MEGA with methyl acrylate and polyethylene glycol monomethyl ether methacrylate (MPEGMA)

The copolymerization was carried out at 60° C. under $N_2$. Firstly, 60 g (0.196 mol) of MEGA were dissolved in water in order to obtain a 25% strength by weight solution. 0.05 g (0.05% by weight, based on the monomers) of 2-mercaptoethanol was added as chain transfer agent. Two feeds were metered into this solution in parallel over a time period of 4 h: (i) 20 g (0.2323 mol) of methyl acrylate, dissolved in 54 g of methanol, and 20 g of MPEGMA (molecular weight 1098) (0.0182 mol), dissolved in 35 g of water; and (ii) 1 g (1% by weight, based on the monomers) of 2,2'-azobis[2-(2-imidazolin-2-yl)propane]dihydrochloride (VAKO-44) as initiator, dissolved in 74 g of water/methanol (1/1 weight/weight). When the addition was complete, the polymerization was continued for 1 h.

This gave a copolymer with 100% monomer conversion (demonstrated by means of $^1$H NMR spectrum) and a K value in accordance with Fikentscher of 35.

EXAMPLE 5

Copolymerization of MEGA with sodium methylacrylate (NaMa) and polyethylene glycol monomethyl ether methacrylate (MPEGMA) (60:20:20% by Weight)

The copolymerization was carried out at 60° C. under $N_2$. Firstly, 45 g (0.147 mol) of MEGA were dissolved in water in order to obtain a 20% strength by weight solution. 0.26 g (0.35% by weight, based on the monomers) of 2-mercaptoethanol was added as chain transfer agent. Two feeds were metered into this solution in parallel over a time period of 4 h: (i) 15 g (0.174 mol) of sodium methylacrylate, dissolved in 60 g of water and 15 g of MPEGMA (molecular weight 1098) (0.0136 mol), dissolved in 60 g of water; and (ii) 0.75 g (1% by weight, based on the monomers) of 2,2'-azobis[2-(2-imidazolin-2-yl)propane]dihydrochloride (VAKO-44) as initiator, dissolved in 60 g of water. When the addition was complete, the polymerization was continued for 1 h.

This gave a copolymer with 100% monomer conversion (demonstrated by means of $^1$H NMR spectrum) and a K value in accordance with Fikentscher of 39.

EXAMPLE 6

Copolymerization of MEGA with methyl acrylate (MA), MPEGMA and methacrylamidopropyltrimethylammonium chloride (MAPTAC)

The copolymerization was carried out at 75° C. under $N_2$. Firstly, 40 g (0.1312 mol) of MEGA were dissolved in water in order to obtain a 25% strength by weight solution. 1 g (1% by weight, based on the monomers) of 2-mercaptoethanol was added as chain transfer agent. Three feeds were metered into this solution in parallel over a time period of 4 h: (i) 25 g (0.2919 mol) of methyl acrylate, dissolved in 54 g of methanol; (ii) 30 g (0.0274 mol) of MPEGMA (molecular weight 1098), dissolved in 50 g of water and 5 g of MAPTAC (0.0456 mol), dissolved in 74 g of water; and (iii) 2 g (2% by weight, based on the monomers) of 2,2'-azobis[2-(2-imidazolin-2-yl) propane]dihydrochloride (VAKO-44) as initiator, dissolved in 74 g of water/methanol (1/1 weight/weight). When the addition was complete, the polymerization was continued for 1 h.

This gave a copolymer with 100% monomer conversion (demonstrated by means of $^1$H NMR spectrum) and a K value in accordance with Fikentscher of 22. Mn: 6800, Mw: 19400.

EXAMPLE 7

Copolymerization of glucose-1β-ethyl acrylate (GEA) with hydroxyethyl acrylate

GEA and 2-hydroxyethyl acrylate (molar ratio 1:1) with a total mass of about 1.5 g were dissolved in 30 ml of boiling water. 0.2 ml of $(NH_4)_2S_2O_8$ (12% in water) and 0.2 ml of $K_2S_2O_5$ (6% in water) were added as initiators. The reaction mixture was placed in an oil bath at 50° C. The polymerization was continued for 20 h under nitrogen. The polymer was then precipitated in acetone and dried at 50° C. in vacuo.

This gave a copolymer with 80% monomer conversion (weight comparison of the monomers used and of the resulting polymer). The polymer structure was confirmed by $^1$H- and $^{13}$C-NMR spectra.

EXAMPLE 8

Adsorption Experiments on Cellulose

The experiments were carried out using the quartz microbalance technique. A QCM-D D (Q-Sense, Västra Frölunda, Sweden) was used. The method is based on the change in intrinsic frequency of a piezoelectric quartz crystal disk as soon as it is laden with a foreign mass. The surface of the quartz can be modified by spin-coating or vapor deposition. The oscillating quartz is located in a measuring cell. The solution to be investigated is pumped into the measuring cell from a storage vessel. The pumping rate is kept constant at 250 μl/min during the measurement time and it is ensured that hoses and measurement cell are free from air bubbles. Each experiment starts with the recording of the base line in demineralized water, with regard to which all frequency and dissipation measurement values are set as zero.

In this example, a cellulose-coated QCM-D quartz (low-charged microfibrillar cellulose, thickness about 6 nm, surface roughness 3-4 nm RMS (according to AFM), adhesion promoter: poly(ethyleneimine)) was used.

Aqueous polymer solutions with a polymer concentration of 10 ppm, 100 ppm and 1000 ppm were investigated. The measurement data was used to calculate the bonded mass of polymer. The results are summarized in the table below:

TABLE 1

Adsorption of copolymers on cellulose

| Ex. | Monomers | Concentration [ppm] | Adsorbed mass [ng/cm²] |
|---|---|---|---|
| 6 | MEGA/MA/MPEGMA/MAPTAC (40/25/30/5% by wt.) | 10 | n.d. |
|   |   | 100 | n.d. |
|   |   | 1000 | 20 |
| 3 | MEGA/MA/MPEGMA (60/20/20% by wt.) | 10 | 50 |
|   |   | 100 | 750 |
|   |   | 1000 | 750 |
| 4 | MEGA/MA/MPEGMA (60/20/20% by wt.) | 10 | n.d. |
|   |   | 100 | 100 |
|   |   | 1000 | 950 | n.d. = not detected

EXAMPLE 9

Adsorption Experiments on Stainless Steel

An arrangement as in example 5 was used. In this example, a sensor with 50 nm stainless steel coating (SS2343) was used. Aqueous polymer solutions with a polymer concentration of 100 ppm and 1000 ppm were investigated. The results are summarized in the table below:

TABLE 2

Adsorption of copolymers on stainless steel

| Ex. | Monomers | Concentration [ppm] | Adsorbed mass [ng/cm²] |
|---|---|---|---|
| 6 | MEGA/MA/MPEGMA/MAPTAC (40/25/30/5% by wt.) | 100 | 225 |
|   |   | 1000 | 275 |
| 3 | MEGA/MA/MPEGMA (60/20/20% by wt.) | 100 | 450 |
|   |   | 1000 | 500 |

EXAMPLE 10

Investigation of the Protein Repulsion of Polymer-coated Surfaces

For the investigation of the protein repulsion by a polymer film of MEGA/MA/MPEGMA (example 3) adsorbed on cellulose, said film was adsorbed from an aqueous solution with a concentration of 500 ppm over 2.5 h, as described in example 8. After rinsing with water, the solution which flowed through the measuring cell was switched to an aqueous solution of 0.1 g/l of bovine serum albumin (BSA). Upon the switch to BSA, no change in frequency was observed, i.e. no BSA was adsorbed.

The invention claimed is:

1. A water-soluble or water-dispersible copolymer comprising the following copolymerized units:
    a) at least one ethylenically unsaturated monomer containing a saccharide side group, and
    b) at least one hydrophilic ethylenically unsaturated monomer different from (meth)acrylamide,
    wherein a weight fraction of the at least one ethylenically unsaturated monomers containing a saccharide side group is from 5 to 95% by weight, and
    wherein the at least one ethylenically unsaturated monomer containing a saccharide side group is represented by at least one of the following formulas (Ia), (Ic), and (Id):

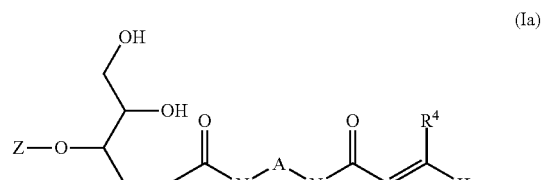

(Ia)

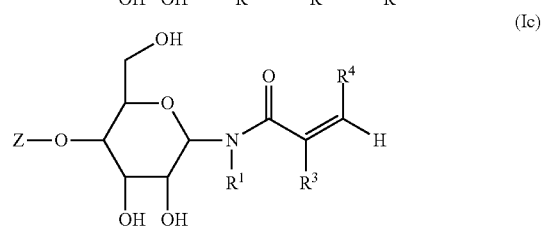

(Ic)

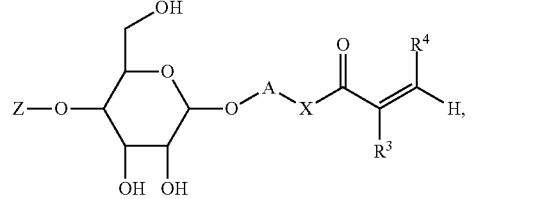

(Id)

wherein
Z is H or a saccharide radical;
A is $C_2$-$C_{10}$-alkylene which may optionally be interrupted by oxygen in ether function and/or may be substituted by one or two carboxyl, hydroxyl and/or carboxamide groups, or is a cycloaliphatic radical;
X is O or $NR^1$;
$R^1$ and $R^2$, independently of one another, are hydrogen, $C_1$-$C_4$-alkyl or $C_1$-$C_4$-hydroxyalkyl;
$R^3$ is H or methyl;
$R^4$ is H, COOH or $COO^-M^+$; and
$M^+$ is an alkali metal ion or an ammonium ion.

2. The copolymer according to claim 1, wherein the at least one hydrophilic ethylenically unsaturated monomer is selected from the group consisting of
    b1) methyl acrylate;
    b2) an anionic/anionogenic monomer;
    b3) a cationic/cationogenic monomer;
    b4) a monomer containing a hydroxyalkyl side group;
    b5) a monomer containin a polyether side group;
    b6) a N-vinyl compound; and
    a combination thereof.

3. The copolymer according to claim 2, wherein the at least one hydrophilic ethylenically unsaturated monomer is the anionic/anionogenic monomer which is at least one monomer selected from the group consisting of an ethylenically unsaturated carboxylic acid, sulfonic acid, phosphonic acid, phosphoric acid ester, and a salt thereof.

4. The copolymer according to claim 3, wherein the anionic/anionogenic monomer is the ethylenically unsaturated carboxylic acid which is at least one acid selected from the group consisting of acrylic acid, methacrylic acid, itaconic acid and maleic acid.

5. The copolymer according to claim 3, wherein the anionic/anionogenic monomer is the ethylenically unsaturated sulfonic acid which is at least one acid selected from the group consisting of 2-propene-1-sulfonic acid, 2-sulfoethyl methacrylate, 3-sulfopropyl acrylate, vinylsulfonic acid, and 2-acrylamido-2-methylpropanesulfonic acid.

6. The coopolymer according to claim 3, wherein the anionic/anionogenic monomer is the ethylenically unsaturated phosphonic acid or the ethylenically unsaturated phosphoric acid ester which are vinylphosphonic acid and acryloxyethyl mono-phosphoric acid ester, respectively.

7. The copolymer according to claim 2, wherein the water-soluble or water-dispersible copolymer comprises the monomer which contains a polyether side group and is represented by the formula:

$$R-O-(CH_2-CHR'-O)_n-CO-CR''=CH_2,$$

wherein R is H or $C_1$-$C_{30}$-alkyl,
R' is hydrogen or methyl,
R" is hydrogen or methyl, and
n is an integer from 2 to 100.

8. The copolymer according to claim 2, wherein the water-soluble or water-dispersible copolymer comprises the N-vinyl compound which is at least one compound selected from the group consisting of a N-vinyllactam and a N-vinylamide of a saturated $C_1$-$C_8$-monocarboxylic acid.

9. A textile detergent composition comprising the homopolymer or copolymer according to claim 1.

* * * * *